No. 699,951. Patented May 13, 1902.
J. C. HENRY, Dec'd.
S. A. HENRY, Executrix.
ELECTRIC CONTROLLER.
(Application filed Apr. 1, 1901.)
(No Model.) 2 Sheets—Sheet 1.
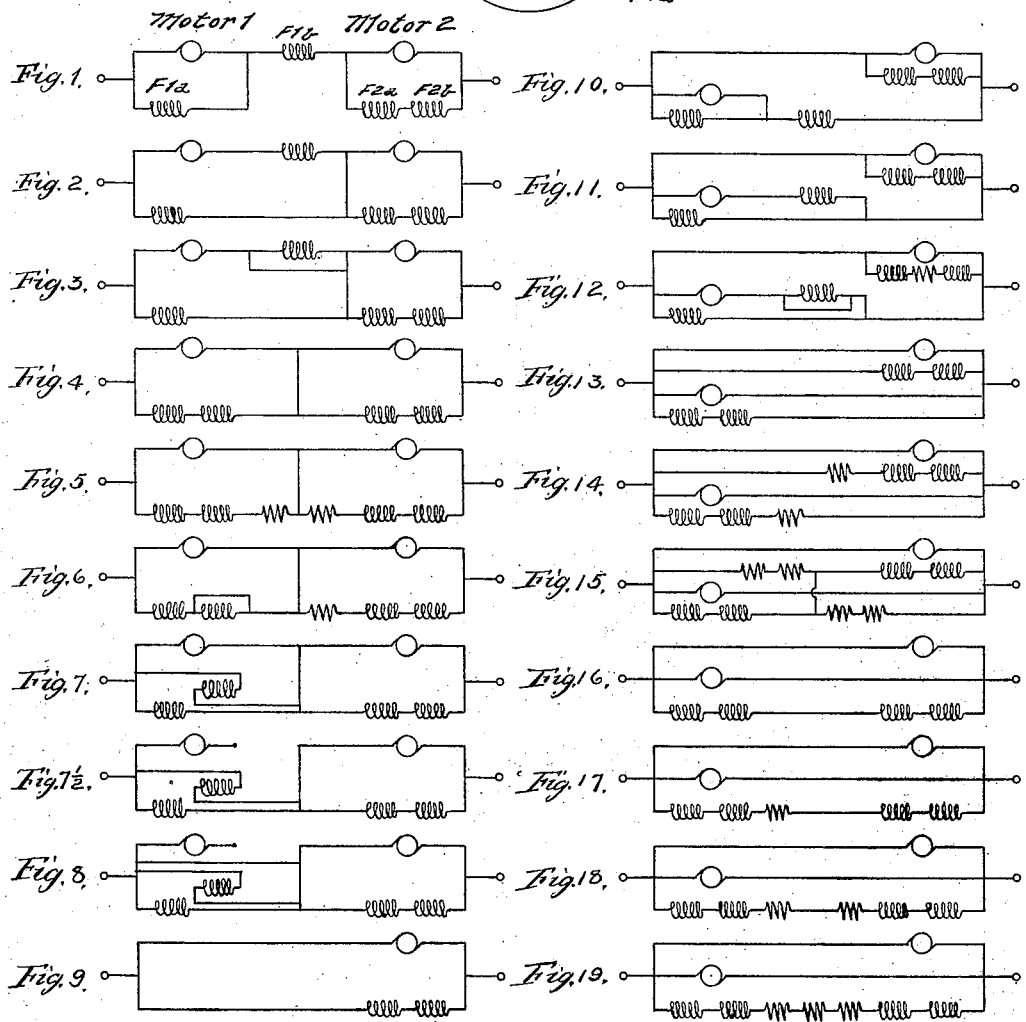
WITNESSES:
INVENTOR.

No. 699,951. Patented May 13, 1902.
J. C. HENRY, Dec'd.
S. A. HENRY, Executrix.
ELECTRIC CONTROLLER.
(Application filed Apr. 1, 1901.)
(No Model.) 2 Sheets—Sheet 2.
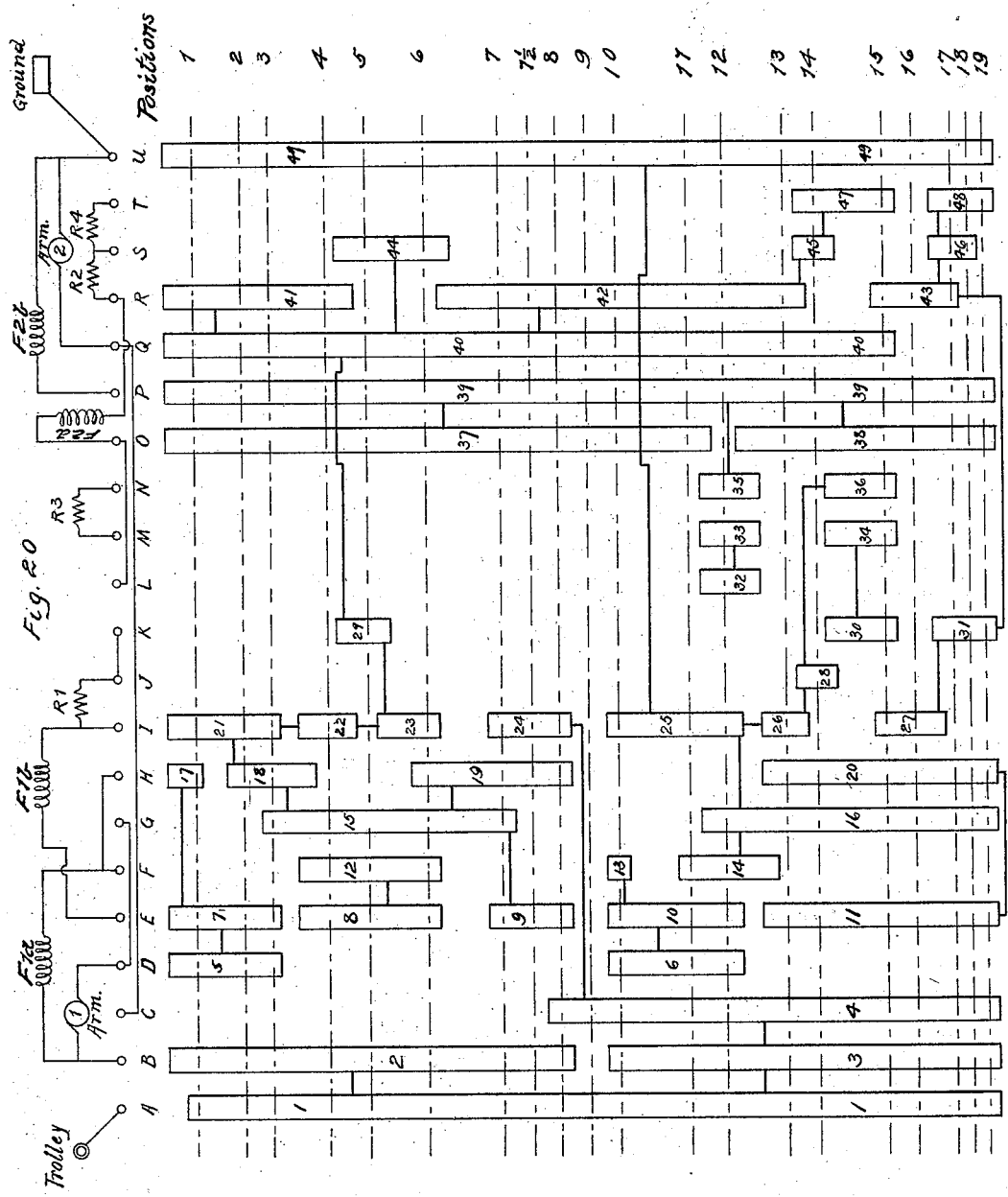

UNITED STATES PATENT OFFICE.

JOHN C. HENRY, OF DENVER, COLORADO; SUSIE A. HENRY, EXECUTRIX OF SAID JOHN C. HENRY, DECEASED, ASSIGNOR TO STANLEY ELECTRIC MANUFACTURING COMPANY, A CORPORATION OF NEW JERSEY.

ELECTRIC CONTROLLER.

SPECIFICATION forming part of Letters Patent No. 699,951, dated May 13, 1902.

Application filed April 1, 1901. Serial No. 54,000. (No model.)

*To all whom it may concern:*

Be it known that I, JOHN C. HENRY, a citizen of the United States, residing at Denver, county of Arapahoe, State of Colorado, have invented certain new and useful Improvements in Electric Controllers, of which the following is a specification.

This invention relates to improvements in controllers for electric vehicles and machinery requiring a great range of duty, such as cars, automobiles, elevators and printing-presses, and such. It is of the class known as "series multiple," and may be further classified as a regenerative controller—*i. e.*, one that drives the car at various speeds by current from the line and recoups the energy of momentum or gravity back to the line when descending grades or stopping the car.

This application is an improvement on numerous other pending and issued patents in my name.

The main feature of the invention is the provision of means to enable a car to start very slowly and have its speed gradually increased without throttling the current by dead resistance.

Figures 1 to 19 represent diagrammatically the course of the current through the various motor parts in successive positions of the controller. Fig. 20 represents a development of the controller. Fig. 21 represents the form of field I prefer to use in connection therewith.

It will be understood in using the form of field-magnets shown in Fig. 21 that one of the pair of coils may be cut out without disturbing the polarity of the magnets, as the pole-piece corresponding to the cut-out coil remains a magnet of the same polarity of a consequent pole type. The various changes are made with the first motor, which will be referred to as "motor No. 1." It will be noticed that no changes are made with motor No. 2 which would effect the style of machine—that is, it may be regarded as a shunt-machine through all of the various combinations. The regulation is mainly accomplished by various changes being made in the arrangement of field-coils of motor No. 1, while frequent use is made of shunt combinations. It should be understood that the gage of wire that I use in the motors for regenerative form of series-parallel controllers is much coarser than is ordinarily used in shunt-motors. When constructing them to work on a five-hundred-volt circuit, I wind the armature as for a five-hundred-volt motor, but the fields as for two hundred and fifty volts only.

In the starting position, Diagram 1, motor No. 1 has its field divided, one section being in shunt with the armature, the other being in series therewith. It will be noticed that the connections are similar to those of an ordinary compound machine; but in this case the resistance of the series coil is unusually high. It, however, prevents the motor from taking more than a small amount of current, at the same time magnetizes the fields intensely, so as to insure strong starting torque at a very slow speed. In the next position, as shown in Diagram 2, it will be seen that the motor has been changed to a long-shunt compound machine, which allows the shunt-coils and the motor as a whole to take more current. The third step forward changes motor No. 1 from a compound machine with long shunt to an ordinary shunt-motor, which still further increases its capacity to receive current and to perform work. This leaves a pair of shunt-motors connected in series, as shown in Diagram 4. A further increase of speed in series position may then be obtained by inserting resistances in the field-circuit, Fig. 5.

In order to change the motors from series to parallel, I first disconnect one motor completely from the circuit, which is done in the following manner: One pair of field-coils is disconnected and reversed, so as to demagnetize the fields. The motor is consequently deprived of its electromotive force or voltage, which permits the armature to be removed with but a trifling flash, as no pressure of voltage remains to project the current. Thus in Fig. 7 the current passes unbroken through the reverse fields in parallel, and after cutting out the armature, Fig. 7½, these fields are short-circuited, Fig. 8, and then withdrawn, as shown in Diagram 9, leaving but one motor in circuit working under intense fields. This arrangement is followed by connecting the first motor to the circuit in parallel with its mate. This is accomplished gradually and substantially in the same manner as it is first varied on starting the motors—i. e., it is connected as an ordinary compound motor, as a compound with long shunt, and as an ordinary shunt-machine, Figs. 10, 11, 12, and 13. After the motors are connected in parallel, it being desired to further speed them up, I decrease the strength of the fields by first inserting resistances, Fig. 14, then changing the field-coils from parallel to series, Figs. 15 and 16, and still further by inserting variable resistance in the circuit, Figs. 17, 18, and 19.

The course of current through the various motor parts, as shown in the diagrams, may be traced by connecting the terminals of the motor parts lettered A to U with the contacts numbered 1 to 49 in the development on the corresponding dotted lines. For instance, Diagram 1 shows a pair of motors connected in series, No. 1 being assembled in the ordinary compound way, while No. 2 is connected as a shunt-machine. The current enters from trolley to finger A to contacts 1 and 2, thence by finger B through armature 1, by finger D, contacts 5 and 7 to finger E, through field-coil F 1 b to finger I, contact 21, also from finger B through field F 1 a to finger H, contact 17 and 7 to the entering side of field F 1 b at finger E. From contact 21 current passes through contacts 22 23 29 to 40, thence by finger Q to armature 2 to the ground, also from the entering side of armature 2 at Q, by contacts 40 and 41, finger R, through field F 2 a, thence by finger O, contacts 37 and 39, finger P, through field F 2 b to the ground. Diagram 9 shows but one motor—that is, No. 2—in the circuit. The current enters by trolley, finger A, contacts 1, 2, 3, and 4, finger C, thence through armature 2 to the ground, also by finger Q, contacts 40 and 42, finger R, field F 2 a, finger O, contacts 37 and 39, through field F 2 b to the ground. Diagram 13 shows the armatures connected in parallel with the fields, also connected in parallel. Current enters by finger A, contacts 1 and 3, to finger B, through armature 1, finger G, through contacts 16, 25, and 49 to the ground, also through contact 4, finger C, to finger Q, thence through armature 2 to the ground, also from contact 3, finger B, field F 1 a, contacts 20 and 11, finger E, through field F 1 b, contacts 26, 25, and 49 to the ground, also by contact 4, fingers C and Q, contacts 40 and 42, finger R, through field F 1 a, contacts 38 and 39, field F 2 b to the ground.

Having thus described my invention, the following is what I claim as new therein and desire to secure by Letters Patent:

1. The method of regulating an electric motor which consists in connecting the field-coils so that on starting the motor may be connected as a compound machine, having one section of its high-resistance field in series with its armature and the other section in shunt therewith, changing said shunt-section to long shunt, so that it embraces the series section and then connecting both of said field-coils in shunt with the armature.

2. The method of regulating an electric motor, which consists in connecting the field-coils so that on starting the motor may be connected as a compound machine, having one section of its high-resistance field in series with its armature and the other section in shunt therewith, changing said shunt-section to long shunt so that it embraces the series section, and then connecting both of said field-coils in shunt and further regulating by varying the current in said fields.

3. The method of regulating a pair of electric motors which consists in starting one of them as a compound machine, using a section of the ordinary shunt-coil as a series coil, changing the shunt connection to long shunt and then to regulate shunt combination cutting one of the said motors from the circuit by first reversing a part of its field-coils, and then connecting it in parallel in the same manner as it was previously started.

4. The method of changing motors from series to parallel, consisting in reversing a part of the field-coils of one of the motors so as to neutralize its magnetism, opening the armature-circuit, allowing the current to pass through the fields in series with the other motor, then short-circuiting and removing the fields of the first-named motor from the circuit and connecting the motors in parallel.

5. The method of operating a pair of electric motors, which consists in connecting the armatures in series relation, and the fields in shunt relation thereto, changing the combined machine to parallel, and then speeding up by increasing the resistance of the field-circuit by changing the field-coils from parallel to series relation, and by inserting resistance.

6. The method of operating a pair of electric motors, which consists in connecting the armatures in series relation and the fields in shunt relation thereto, changing the combined machine to parallel and then speeding up by placing the fields of both motors in series.

7. The method of operating a pair of electric motors which consists in connecting the armatures in series relation and the field-coils partly in series and partly in shunt relation, and then changing the field-coils wholly to series relation.

8. The method of operating electric motors which consists in reversely connecting a part of the coils of a motor to neutralize the field thereof, and then opening the armature-circuit.

In testimony whereof I have hereunto set my hand and seal, this 6th day of March, A. D. 1901, in the presence of two witnesses.

JNO. C. HENRY. [L. S.]

Witnesses:
CARLE WHITEHEAD,
D. CARL HENRY.